United States Patent
Chui et al.

(10) Patent No.: US 10,650,586 B2
(45) Date of Patent: May 12, 2020

(54) AUTOMATED MESH GENERATION

(71) Applicant: Outward, Inc., San Jose, CA (US)

(72) Inventors: Clarence Chui, Los Altos Hills, CA (US); Christopher Murphy, San Jose, CA (US)

(73) Assignee: Outward, Inc., San Jose, CA (US)

( * ) Notice: Subject to any disclaimer, the term of this patent is extended or adjusted under 35 U.S.C. 154(b) by 0 days.

(21) Appl. No.: 15/674,447

(22) Filed: Aug. 10, 2017

(65) Prior Publication Data
US 2019/0051044 A1     Feb. 14, 2019

(51) Int. Cl.
*G06T 17/20* (2006.01)
*G06T 15/04* (2011.01)
*G06T 15/06* (2011.01)

(52) U.S. Cl.
CPC .............. *G06T 17/20* (2013.01); *G06T 15/04* (2013.01); *G06T 15/06* (2013.01); *G06T 2210/21* (2013.01)

(58) Field of Classification Search
CPC .......... G06T 17/20; G06T 15/04; G06T 15/06
See application file for complete search history.

(56) References Cited

U.S. PATENT DOCUMENTS

| | | | |
|---|---|---|---|
| 6,208,347 B1 | 3/2001 | Migdal | |
| 6,542,157 B1 | 4/2003 | Browne | |
| 8,818,773 B2* | 8/2014 | Eugene | G06T 11/001 345/582 |
| 9,679,362 B2* | 6/2017 | Chmielewski | G06T 5/002 |
| 2004/0085314 A1 | 5/2004 | Lin | |
| 2006/0044312 A1 | 3/2006 | Loop | |
| 2008/0238924 A1* | 10/2008 | Sawazaki | G06T 11/203 345/441 |
| 2010/0156901 A1* | 6/2010 | Park | G06T 15/205 345/420 |
| 2011/0254840 A1 | 10/2011 | Halstead | |
| 2011/0320319 A1* | 12/2011 | Streich | G06Q 30/06 705/27.1 |
| 2013/0106834 A1* | 5/2013 | Curington | G06T 9/00 345/419 |
| 2017/0017741 A1* | 1/2017 | Lim | G06T 17/20 |
| 2017/0153111 A1 | 6/2017 | Bandyopadhyay | |

OTHER PUBLICATIONS

Liu et al., "Creating Simplified 3D Models with High Quality Textures", arXiv: 1602.06645v1 [cs.GR] Feb. 22, 2016, Retrieved on Sep. 28, 2018. Retrieved from URL: https://arxiv.org/pdf/1602.06645.pdf, entire document.

Martha et al., "Mesh Generation", Computer Graphics for Engineering, Jun. 2014. Retrieved on Sep. 28, 2018. Retrieved from URL: https://webserver2.tecgraf.puc-rio.br/ftp_pub/lfm/L3A_MeshGeneration.pdf, entire document.

* cited by examiner

*Primary Examiner* — Yi Yang
(74) *Attorney, Agent, or Firm* — Van Pelt, Yi & James LLP

(57) ABSTRACT

Various techniques associated with automatic mesh generation are disclosed. One or more center curves of an outline of an object or figure are first determined. Next, for each of a plurality of points of each of the one or more center curves, a pair of rays is cast from a center curve in opposite directions, wherein the rays collide with opposite sides of the outline, and a collision pair is generated that comprises a line connecting collision points of the pair of rays on opposite sides of the outline. A mesh model of the object or figure is generated by mapping each of a set of collision pairs to polygons used to define the mesh model.

45 Claims, 15 Drawing Sheets

AUTOMATED MESH GENERATION

BACKGROUND OF THE INVENTION

Existing solutions for generating a mesh for an object and rendering the object with prescribed textures are inefficient, low quality, and often require at least some manual intervention. Thus, improved mesh generation and rendering techniques are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Geometric modeling and polygon mesh generation are fundamental aspects of computer graphics applications. Various techniques associated with automatically and efficiently generating well-ordered, high quality meshes from arbitrary input data are disclosed herein.

Figure 1:
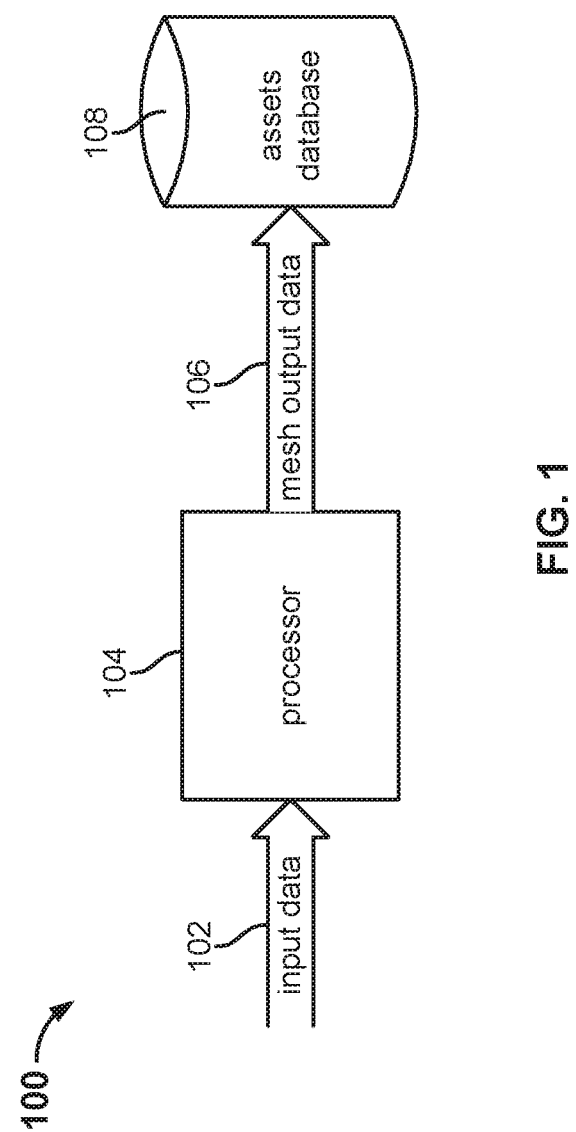
FIG. 1 is a high level block diagram illustrating an embodiment of a system for automatic polygon mesh generation.

FIG. 1 is a high level block diagram illustrating an embodiment of a system for automatic polygon mesh generation. As depicted, in system 100, input data 102 is processed by processor 104 to generate mesh output data 106, which is stored in a database 108 comprising object assets. Although depicted as single blocks, each of processor 104 and database 108 may comprise a plurality of possibly networked components. For example, processor 104 may comprise a plurality of physical processors and/or virtual machines that are, for instance, configured for parallel processing. Communication between various components comprising system 100 may be facilitated by one or more public and/or private, wired and/or wireless networks.

In various embodiments, system 100 may be employed to generate a three-dimensional mesh model of an individual object and/or of each of a plurality of objects comprising a scene. In some embodiments, system 100 generates well-ordered meshes from two-dimensional outlines of objects or figures. Input data 102 may comprise any arbitrary input source content that is desired to be converted or transformed into a three-dimensional model representation, i.e., into one or more corresponding polygon meshes. In some embodiments, input data 102 directly comprises outline data corresponding to one or more objects or figures. Alternatively, in some embodiments, input data 102 comprises real time or stored camera captured image or video data and/or point cloud data generated by a three-dimensional scanner from which processor 104 identifies one or more objects and figures and generates corresponding outline data that is subsequently processed to generate mesh representations.

Outline data associated with an object or figure is processed by processor 104 according to the disclosed techniques to generate a mesh for the object or figure. In some embodiments, outline data associated with an object or figure comprises a set of one or more closed loop shapes or geometries. The outline data may comprise two-dimensional or three-dimensional outline data. In some embodiments, processor 104 operates on two-dimensional outline data to generate a corresponding mesh. In such cases, a three-dimensional outline may be processed by slicing the three-dimensional outline to generate two-dimensional cross-sections, which are individually processed to generate corresponding meshes that are then combined to generate a mesh representation of the three-dimensional outline. The generated mesh of an object or figure may be employed to apply any arbitrary texture to the object or figure when rendering the object or figure.

Figure 2:
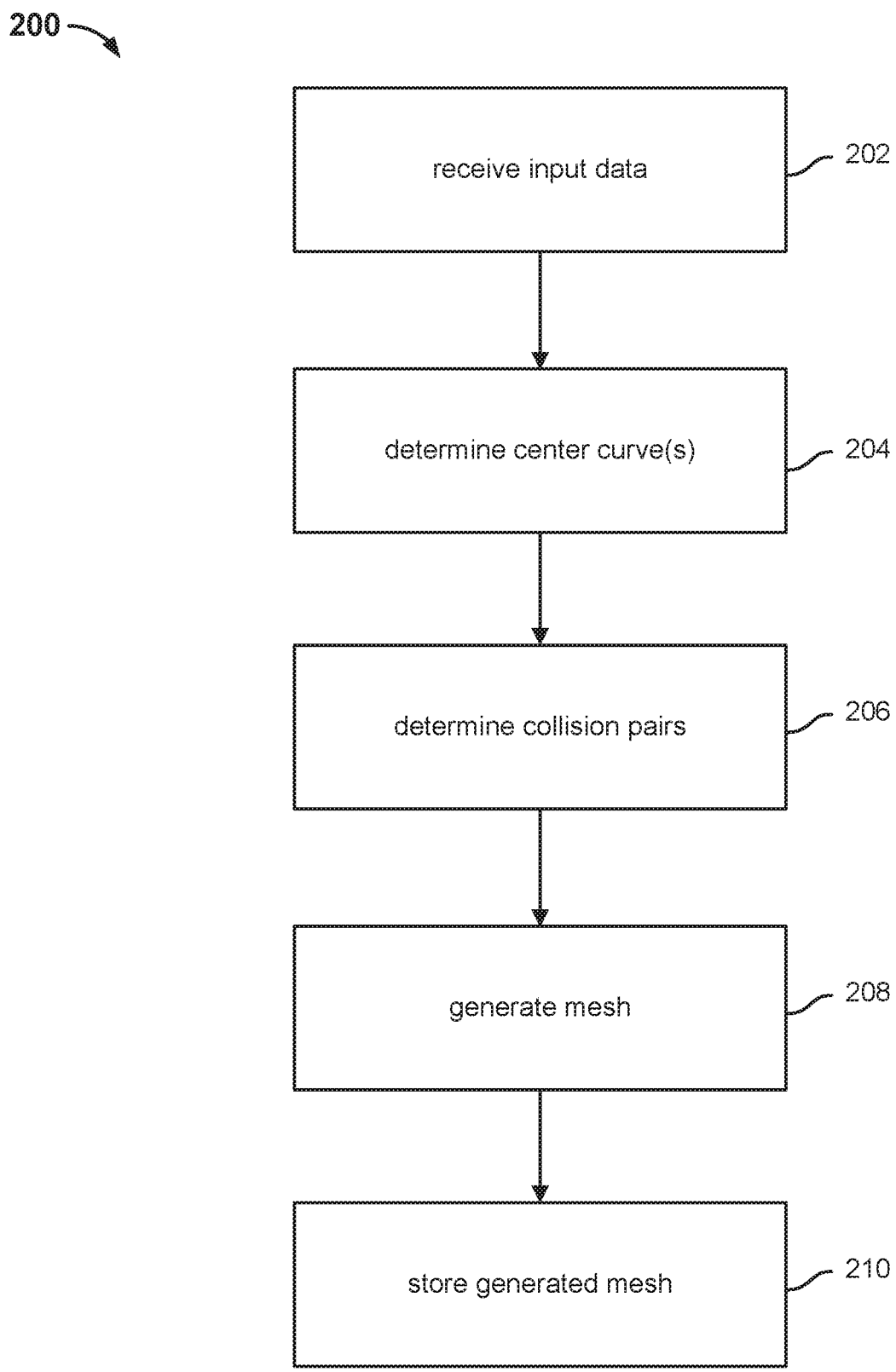
FIG. 2 is a high level flow chart illustrating an embodiment of a process for automatically generating a mesh.

FIG. 2 is a high level flow chart illustrating an embodiment of a process for automatically generating a mesh. For example, process 200 may be employed by processor 104 of system 100 of FIG. 1. Process 200 specifically describes steps for generating a mesh model for two-dimensional outline data. However, process 200 may generally be employed to generate a mesh model for any input data. That is, any two-dimensional or three-dimensional input data may be transformed into a set of one or more two-dimensional outlines. In the cases in which the input data is deconstructed into a plurality of two-dimensional outlines, process 200 is iterated for each two-dimensional outline, and the mesh models resulting from each iteration are combined to generate a mesh model for the original input data. Thus, process 200 may generally be employed for generating a mesh for any input data from which outline data can be generated. For the purposes of explanation, various steps of process 200 are further described and illustrated in the context of generating meshes for font letters.

Process 200 starts at step 202 at which input data is received. In some embodiments, the input data received at step 202 comprises an outline of an object or figure. Alternatively, in some embodiments, step 202 optionally further comprises generating an outline of an object or figure from any arbitrary received input data. The remaining steps 204-210 of process 200 operate on outline data directly received or determined at step 202.

Figure 3A:
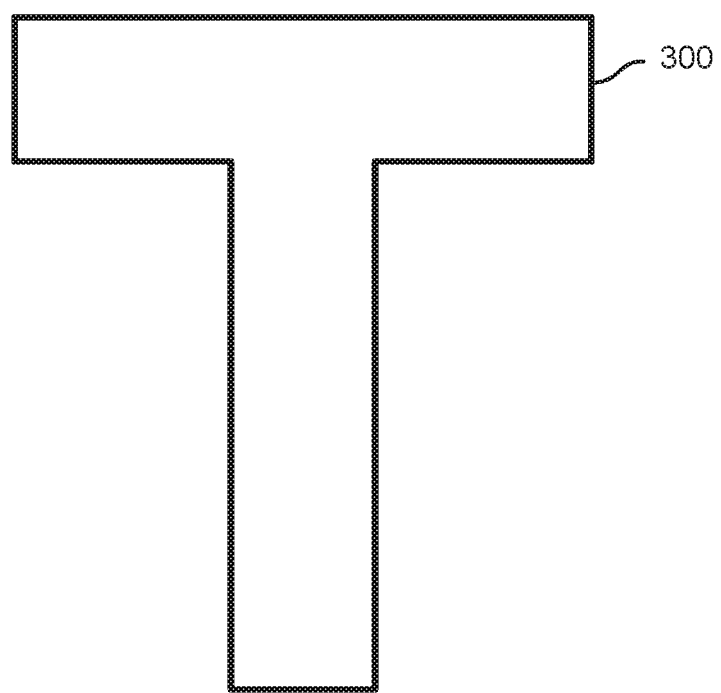
FIGS. 3A-3E illustrate an example of determining center curves for an outline of a letter.

As one example, an outline or outer shell of a font letter may be received at step 202 from a font file, such as a TrueType (.ttf) or OpenType (.otf) file. FIG. 3A illustrates an example of an outline 300 of a font letter "T". As depicted, the outline edges or borders bind and enclose the shape of the letter in a closed geometry.

At step 204 of process 200 of FIG. 2, one or more center curves are determined for the outline data received or determined at step 202. In various embodiments, any one or more appropriate path finding algorithms may be employed to determine or approximate one or more curves representing the center of an outline of an object or figure at step 204.

A technique that may be employed for determining a center curve includes superimposing a dense grid of evenly-spaced points around an outline, filtering out or removing all grid points that fall outside of the outline, scoring the grid points that fall on or inside the outline to determine center points, and connecting and/or interpolating between center points to form a center curve. As one example, a score of "0" may be assigned to grid points that fall on an outline, and a score of "maximum(score of each neighbor)−1" may be assigned to grid points that fall inside the outline. Such a scoring scheme results in the score of a given grid point to represent the relative distance of that grid point to the outline and results in grid points that are locally furthest from the outline to have values less than those of their neighbors. That is, grid points that are closest to the center of the outline will have the largest negative values with this scoring scheme. Grid points that are not locally furthest may be filtered or removed so that only the center points, i.e., locally furthest points, remain. A center curve may be generated by connecting and/or interpolating between neighboring center points.

Figure 3B:
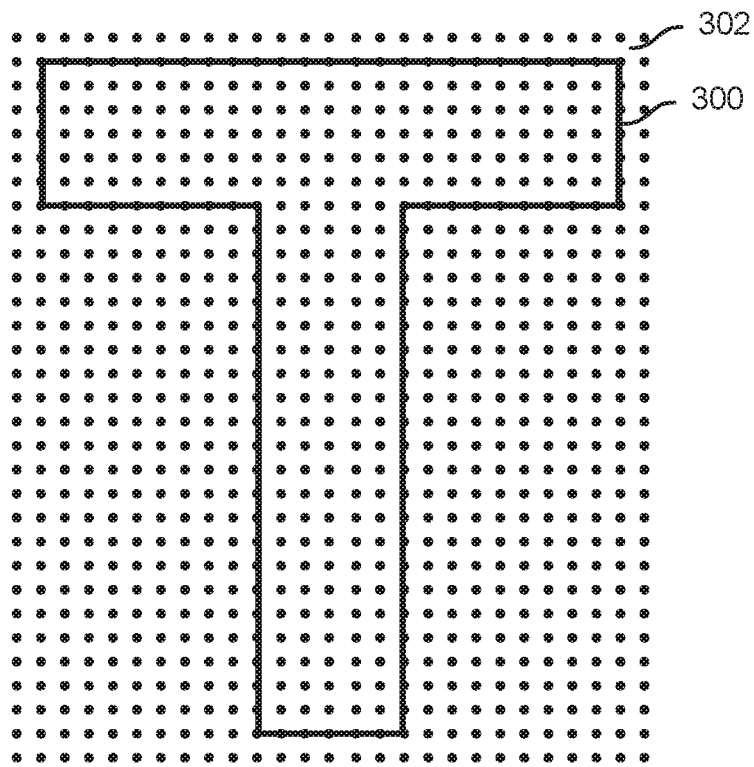
Figure 3C:
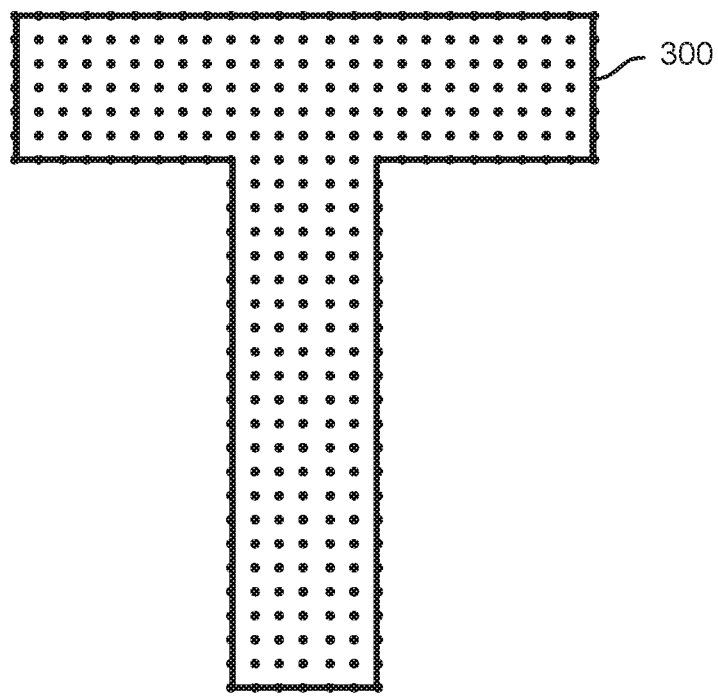
Figure 3D:
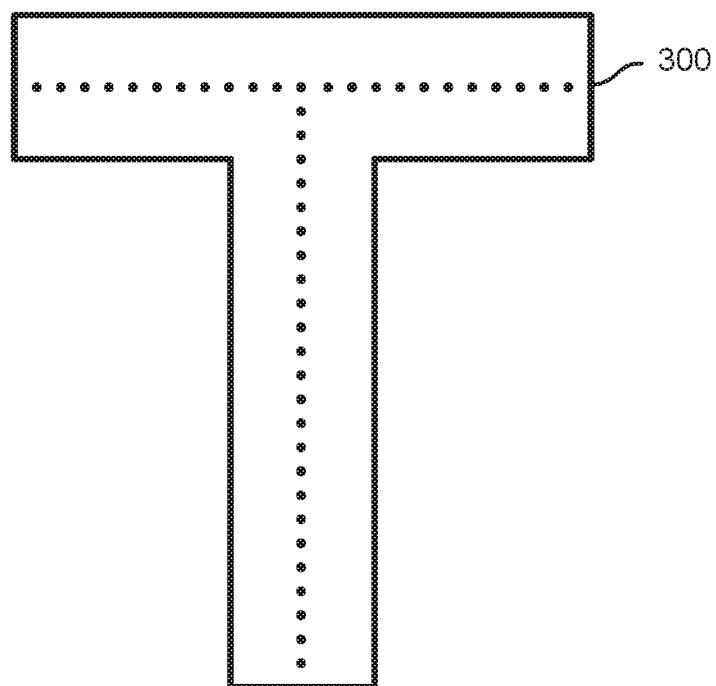
Figure 3E:
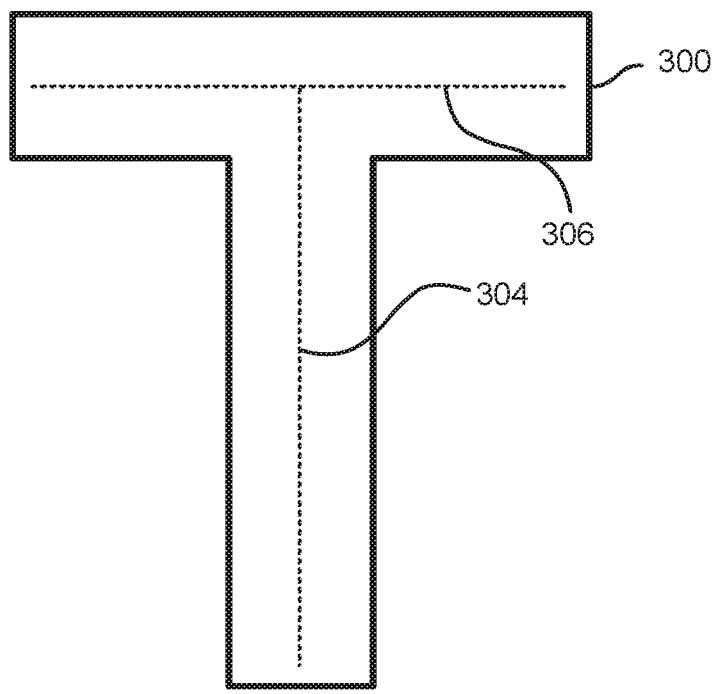

Determining center lines of outline 300 of the font letter "T" is illustrated in FIGS. 3B-3E. As illustrated in FIG. 3B, a grid 302 of evenly-spaced points is superimposed around outline 300. As illustrated in FIG. 3C, all grid points that fall outside outline 300 are filtered out or removed. For example, winding numbers may be used with respect to each grid point of grid 302 in FIG. 3B to determine whether that grid point is outside, on, or inside the borders or boundaries of the letter. A scoring function, such as described above, may be employed to identify and isolate the locally furthest grid points, i.e., the center points, as illustrated in FIG. 3D. The identified center points are connected to their neighbors, e.g., via interpolation, to generate center lines 304 and 306 as illustrated in FIG. 3E.

Figure 4A:
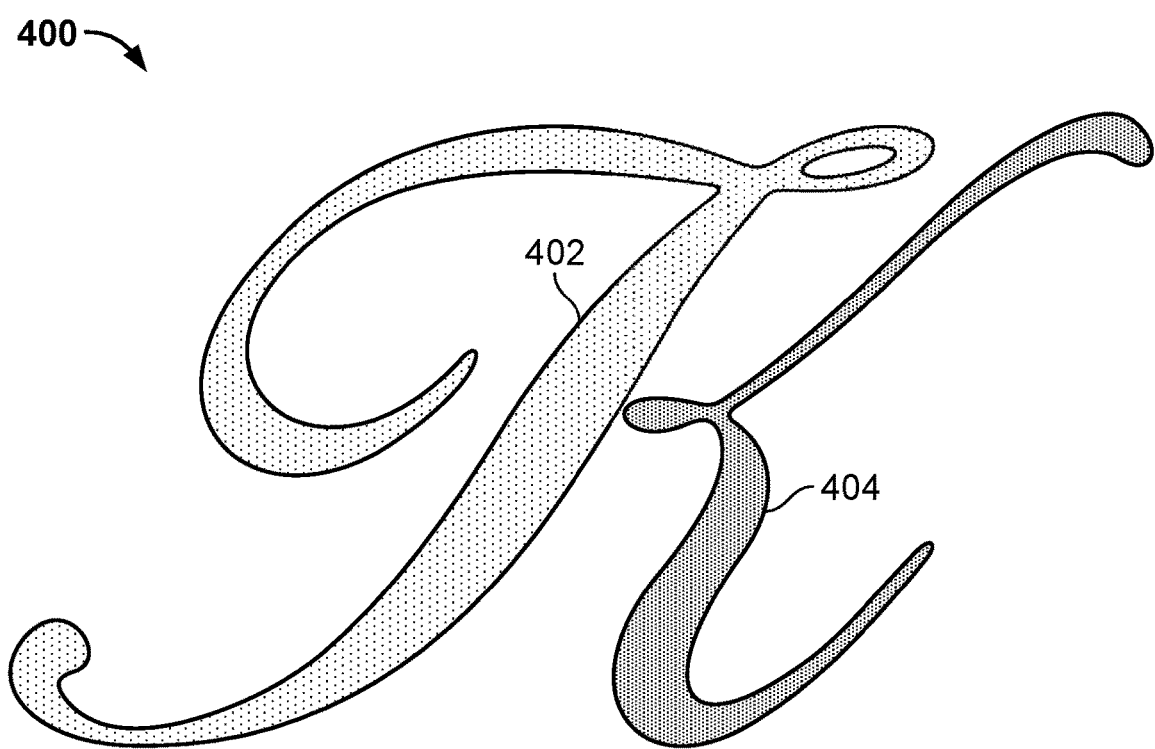
FIGS. 4A-4C illustrate an example of determining center curves for an outline of a letter.
Figure 4B:
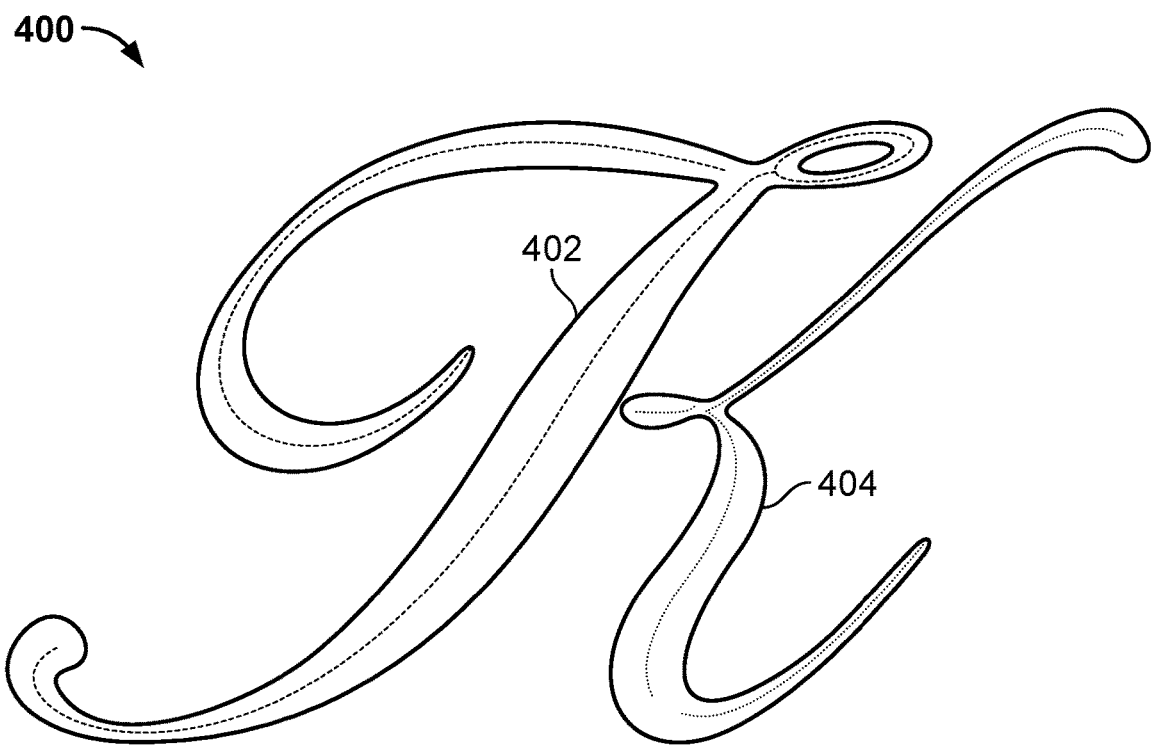
Figure 4C:
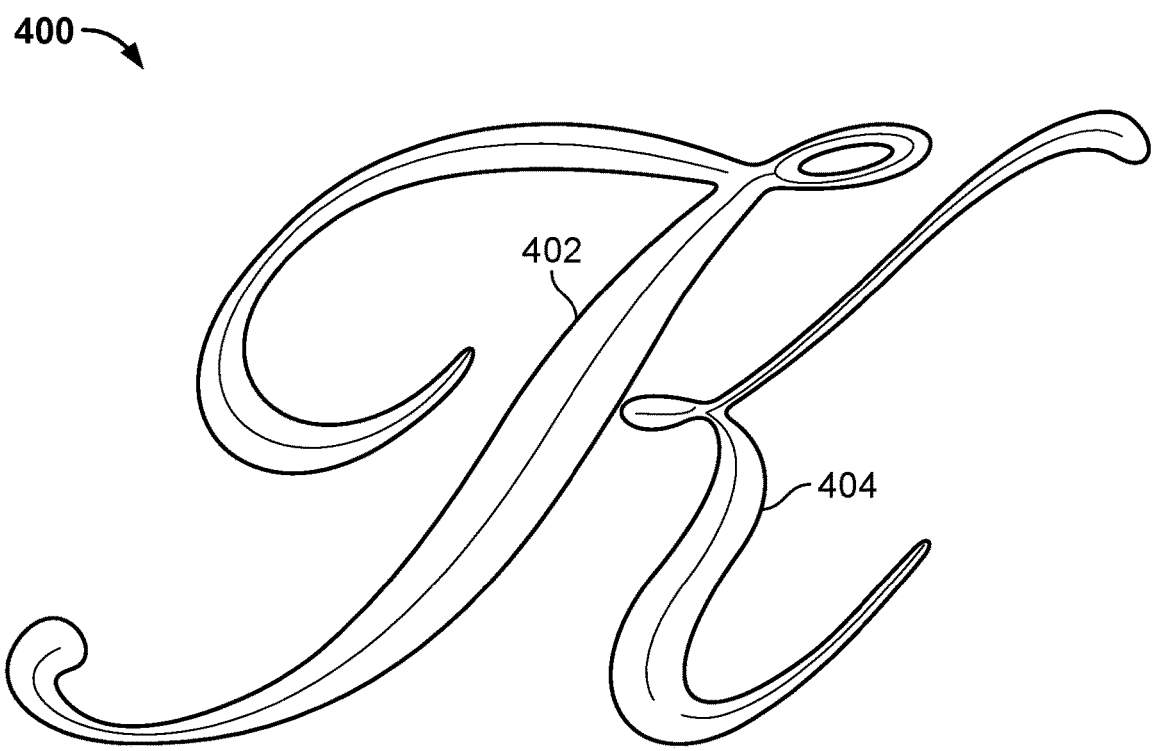

In some cases, outline data from step 202 of process 200 of FIG. 2 comprises a plurality of components that are separately or independently processed for mesh generation either serially or in parallel at steps 204-210 of process 200. For example, the input data of step 202 may comprise a font template or one or more words constructed from letters comprising a prescribed font file. In such cases, the various mesh generation steps 204-210 of process 200 may be iterated for each letter. As a further example, a prescribed letter may itself comprise a plurality of components or contours, for each of which mesh generation steps 204-210 of process 200 are iterated. FIG. 4A illustrates an example of an outline 400 of a calligraphy font letter "K" that comprises a plurality of contours 402 and 404. Each contour comprises a closed shape or geometry. In cases in which outline data comprises a plurality of contours, the contours to which various grid points belong are first identified before determining the center curves of the contours at step 204. For example, a flood-fill operation may be employed to paint grid points different colors based on the contour to which they belong in order to identify or determine the different contours comprising given outline data and their associated grid points. As illustrated in FIG. 4A, grid points comprising the two contours 402 and 404 are painted different colors. Each contour is independently processed at the various steps of process 200. For example, each contour 402 and 404 is separately processed to identify center points of the contours as illustrated in FIG. 4B and center curves of the contours as illustrated in FIG. 4C.

At step 206 of process 200 of FIG. 2, collision pairs are determined for points comprising center curves determined at step 204. A collision pair comprises a line that maps or connects one side of an outline to its corresponding opposite side and effectively represents the thickness of a prescribed portion of an outline. More specifically, a collision pair comprises a line that connects a given center point of a center curve with points on both sides of an outline of which the given center point represents a center. The concept of "collision" stems from ray tracing, which comprises extending rays from a point and determining the first surfaces that the rays collide with or hit. With respect to a collision pair, rays are cast from a center point comprising a center curve and collide with surfaces or boundaries of an outline.

Figure 5:
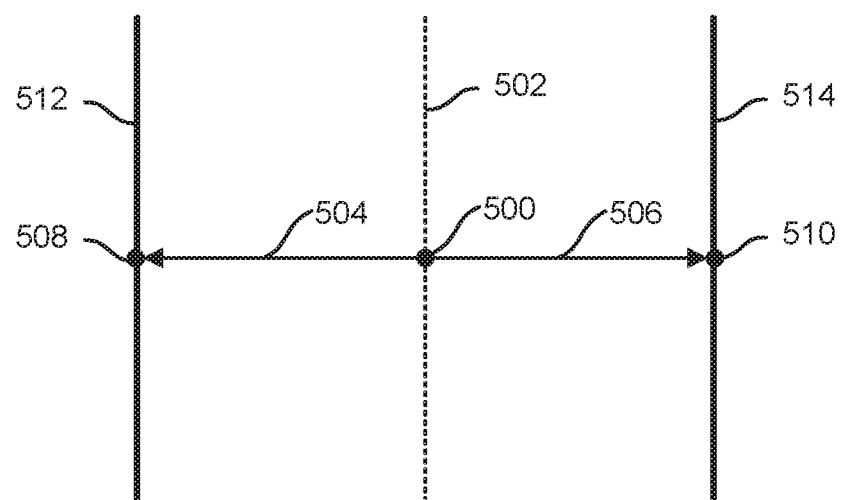
FIG. 5 illustrates an embodiment of a technique for generating a collision pair.

FIG. 5 illustrates an embodiment of a technique for generating a collision pair. As depicted, for a given center point 500 on center line 502, rays 504 and 506 perpendicular to center line 502 are cast in opposite directions and hit collision points 508 and 510 on outline surfaces 512 and 514, respectively. These two collision points are combined to form a collision pair, i.e., a line comprising points 508 and 510 as well as center point 500. This process is repeated for each of a plurality of densely spaced center points comprising a center curve to generate a large number of collision pairs for each center curve.

Figure 6A:
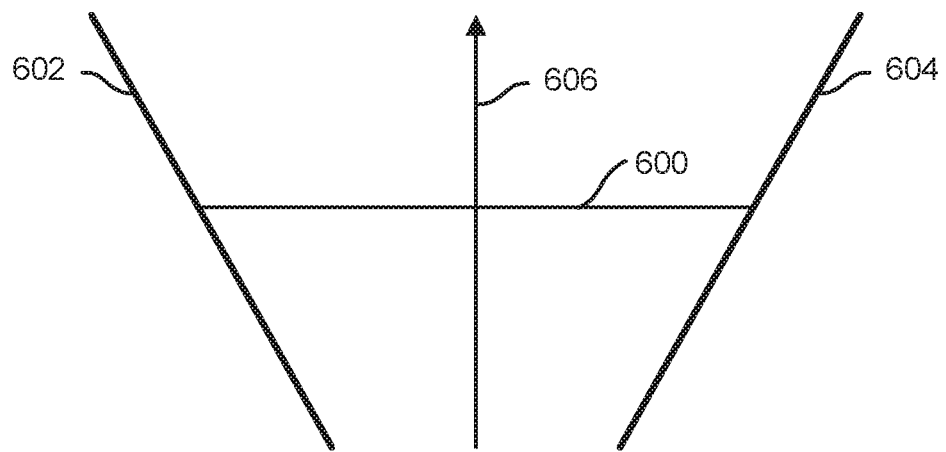
FIGS. 6A-6B illustrate an embodiment of a technique for generating an optimal collision pair.

Casting rays from a center point in directions perpendicular to an associated center curve may not always result in an optimal collision pair. This may be the case, for example, at portions of an outline exhibiting significant shrinkage and/or curvature. In some embodiments, a metric that provides a measure of the quality of a collision pair is employed to identify a better or optimal collision pair. In some cases, for example, an optimal collision pair comprises a collision pair whose angle is closest to 90° with a vector representing the average direction of the collision points comprising the collision pair. Consider the example depicted in FIG. 6A in which line 600 comprises a collision pair, 602 and 604 comprise outline surfaces, and 606 comprises a vector representing the average direction of the collision points, i.e., the average direction of unit vectors pointing in the direction of outline surfaces 602 and 604 where they collide with line 600. In this example, collision pair 600 is perpendicular to vector 606 and hence comprises an optimal collision pair.

Figure 6B:
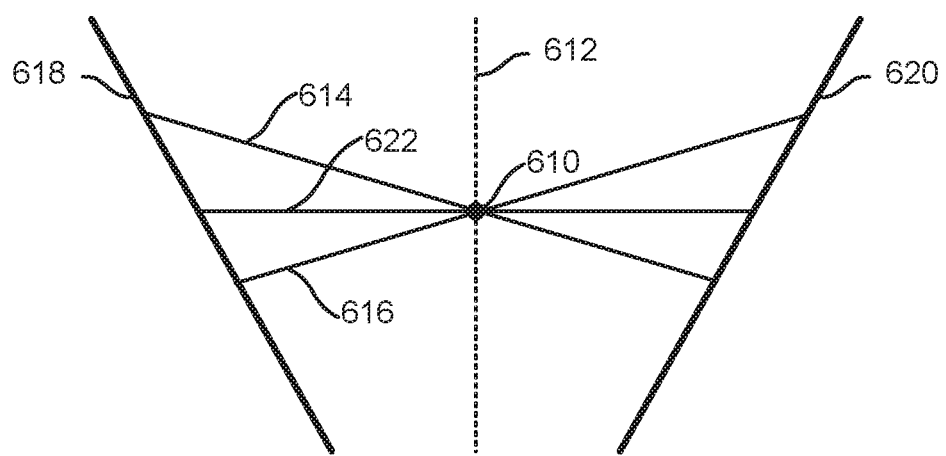

In some embodiments, a range of possible collision pairs is examined to determine and/or estimate a better or optimal collision pair from the range that best satisfies such a quality metric. FIG. 6B illustrates an embodiment of a technique for determining an optimal collision pair from a range of possible collision pairs. As depicted, for a given center point 610 on center line 612, rays are cast in opposite directions at prescribed non-perpendicular angles (e.g., 70° and 110°) from center line 612 to generate minimum and maximum collision pairs 614 and 616 of the range, and the quality of each of the minimum and maximum collision pairs 614 and 616 is determined based on a value of the angle between each collision pair and a vector representing the average direction of corresponding collision points on outline surfaces 618 and 620. Interpolation based on errors of the minimum and/or maximum collision pairs 614 and 616 (e.g., the differences between their angles with the vectors representing the average directions of the collision points and 90°) may be employed to determine or estimate an optimal or best answer, i.e., collision pair 622 in FIG. 6B. In the given example, optimal collision pair 622 is perpendicular to center curve 612. However, in other cases, the optimal collision pair may have an angle other than 90° with the center curve.

Figure 7A:
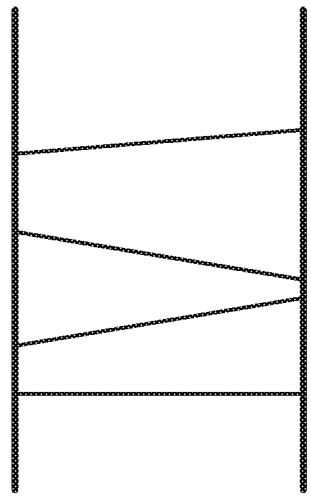
FIGS. 7A-7C illustrate examples of series of collision pairs that are ordered and not ordered.
Figure 7B:
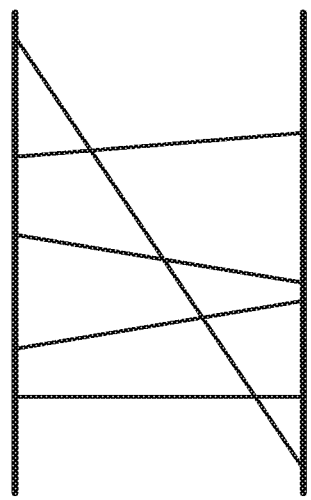
Figure 7C:
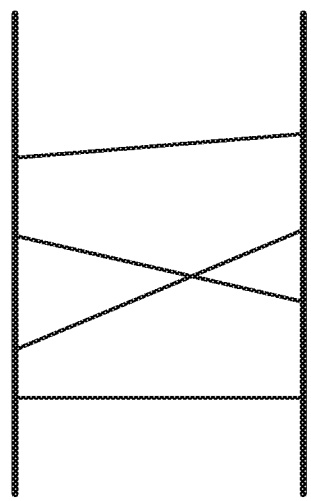

A series of collision pairs is considered "ordered" if adjacent collision pairs comprising the series are adjacent on opposite sides of the outline and if adjacent collision pairs comprising the series have the same order on opposite sides of the outline. Collision pairs that satisfy the aforementioned criteria move along the center curve and opposite edges of the outline in the same direction. That is, ordered collision pairs exhibit monotonic behavior. FIGS. 7A-7C illustrate examples of series of collision pairs that are ordered and not ordered. In the given examples, the top and bottom horizontal lines represent opposing outline edges or boundaries. The collision pairs in the example of FIG. 7A are ordered since adjacent collision pairs are adjacent on both sides of the outline and have the same order on both sides of the outline, i.e., none of the collision pairs intersect. However, the series of collision pairs in the examples of FIGS. 7B and 7C are not ordered since neither satisfies both criteria to be considered ordered and since both exhibit collision pair intersections. Such unmatched collision pairs may result, for example, when outline borders experience sudden or sharp turns and angles.

Figure 8A:
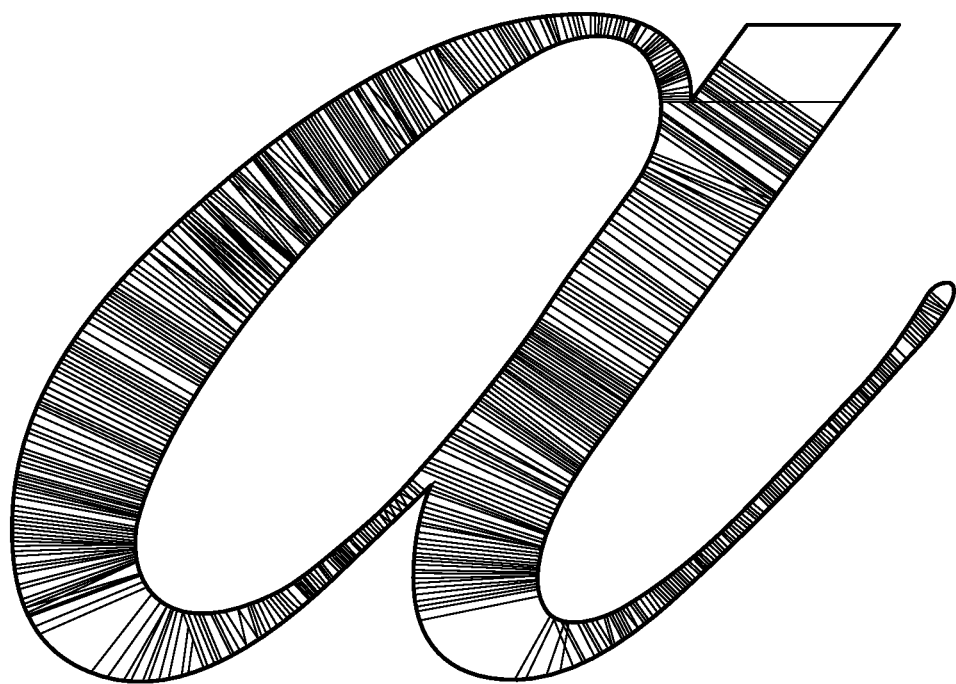
FIGS. 8A-8D illustrate examples of techniques for selecting a set of collision pairs for an outline.

In some embodiments, step 206 of process 200 of FIG. 2 comprises selecting a set of collision pairs that comprises one or more connected series of well-ordered collision pairs that exhibit monotonic behavior. That is, errant collision pairs, i.e., collision pairs that are unmatched or not ordered, are removed so that only ordered or matched collision pairs remain. Any gaps from removing errant collision pairs may be filled using interpolation techniques. FIGS. 8A-8D illustrate examples of techniques for selecting a set of collision pairs for an outline. FIG. 8A illustrates collision pairs generated for an outline of a font letter "a" using the above described collision pair generation techniques. As depicted, most of the generated collision pairs are ordered but some are not as exhibited by the crisscrossing and intersections especially near sharp turns in the outline. Moreover, a few empty spaces or areas exist within the outline at which the employed collision pair generation technique failed to generate any collision pairs. Such gaps may also be filled using interpolation techniques.

Figure 8B:
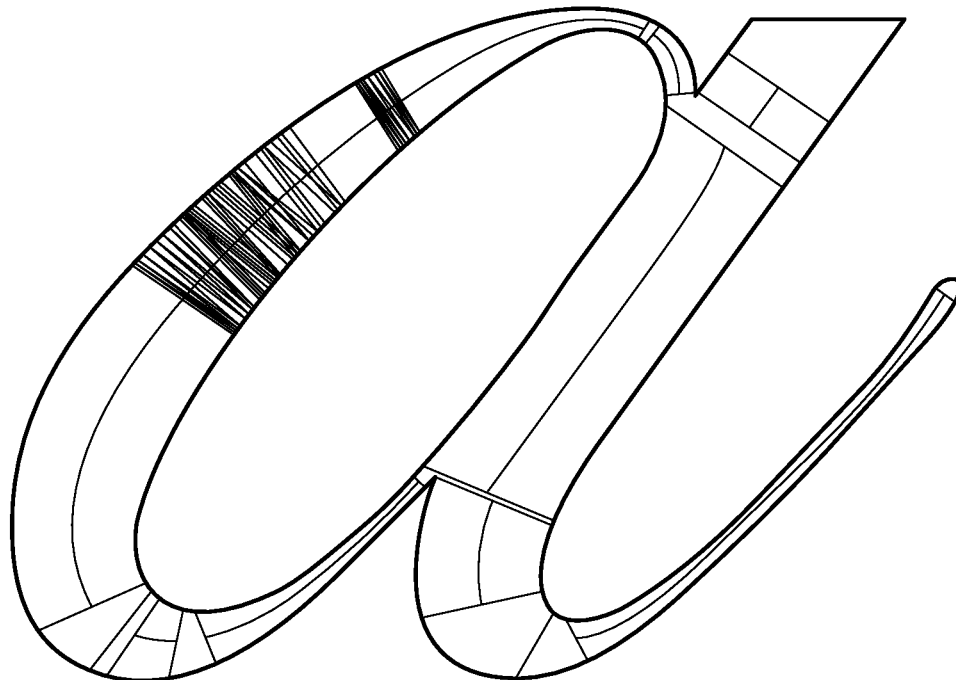
Figure 8C:
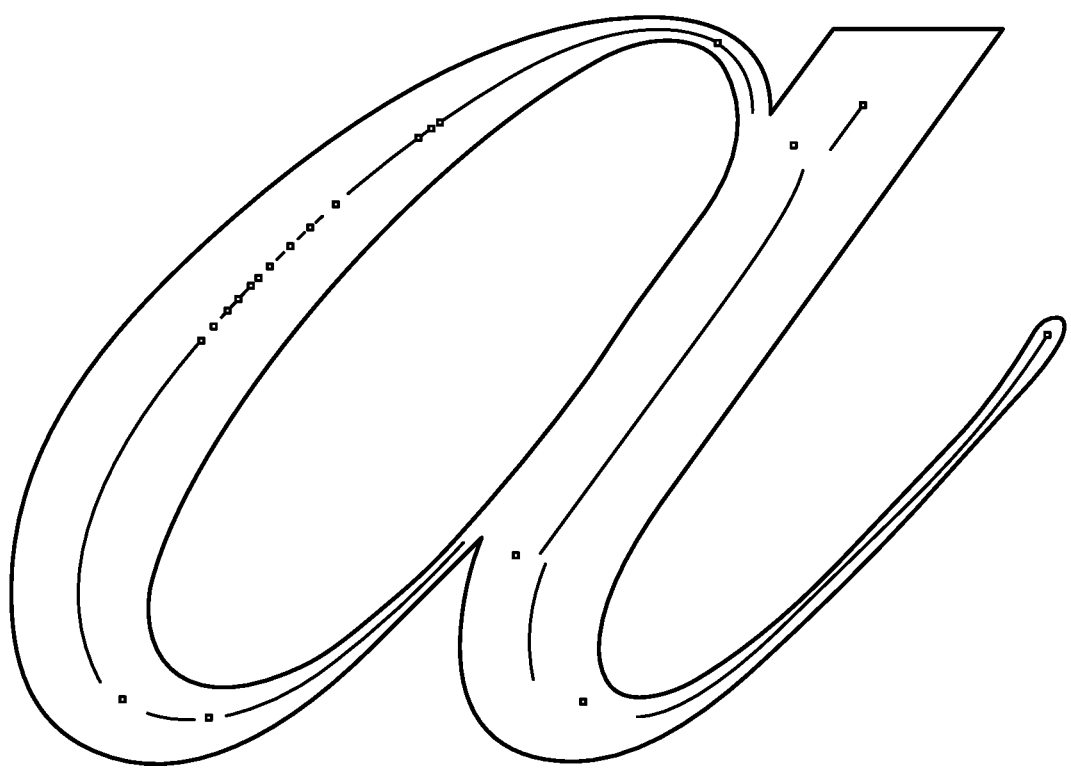
Figure 8D:
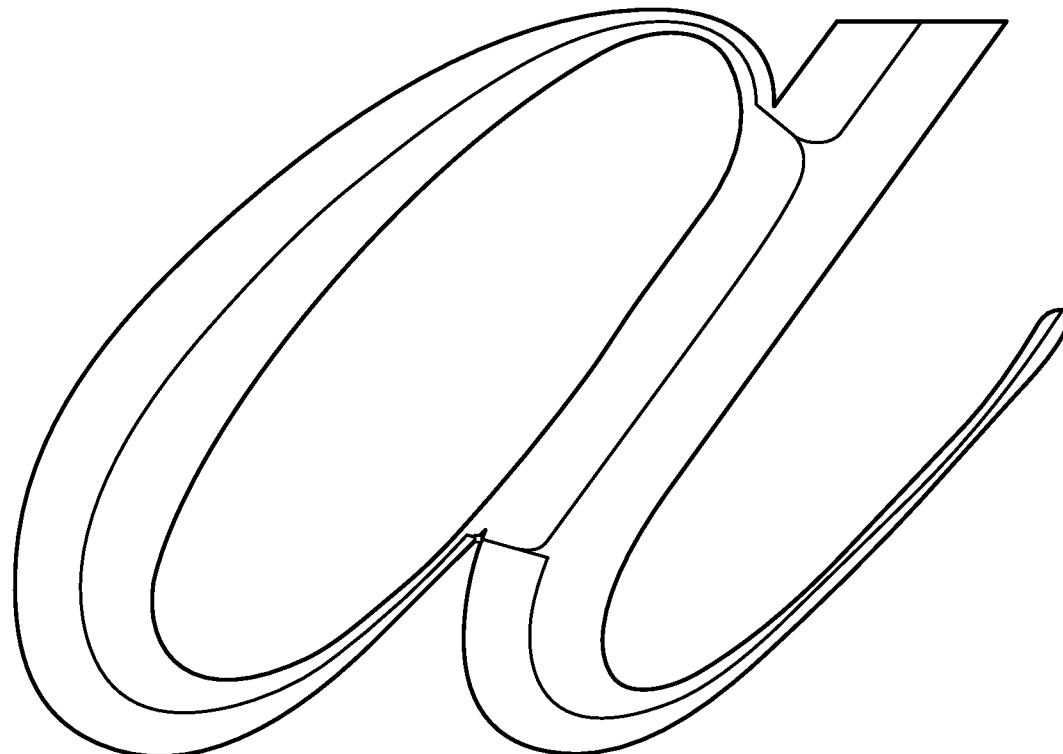

In some embodiments, one or more series of a plurality of ordered collision pairs are combined into "runs" so that, for example, outline areas with errant and/or missing collision pairs can be identified. FIG. 8B illustrates generating runs for the ordered collision pairs of FIG. 8A. In FIG. 8B, runs coincide with and/or are close to the center curves of the outline, errant collision pairs are perpendicular to the runs, and empty areas have no collision pairs. As described above, errant collision pairs are removed. In some embodiments, a graph may be generated to identify incomplete areas of an outline that do not have collision pairs. FIG. 8C illustrates an example of such a graph. In FIG. 8C, runs coincide with and/or are close to the center curves of the outline, errant collision pairs have been removed, and points or dots have been added that represent incomplete areas within the outline that have no collision pairs and at which adjacent runs are not connected. Such incomplete areas may result from removing errant collision pairs and/or because no collision pairs were generated for those areas. Each point representing an incomplete area in the graph of FIG. 8C is connected to one, two, or three or more runs. In the first case, a point connected to only one run may be interpreted as an end, and the run may be appropriately tapered off, for example, based on the closest edges or boundaries of the outline. In the second case in which a point is connected to two adjacent runs, the two adjacent runs may be merged using interpolation. In the third case in which a point is connected to three or more runs (which may occur, for example, at joints of an outline), all connected runs may be interpolated to a common center point. Although some examples of handling incomplete outline areas have been described, any one or more appropriate techniques may be employed in various embodiments. FIG. 8D illustrates a completed graph for the given example. As depicted, all runs are smoothly connected. Each point on the outline is matched to a corresponding point on the opposite side of the outline via a collision pair, and all collision pairs comprising the runs are ordered and monotonic.

Figure 9A:
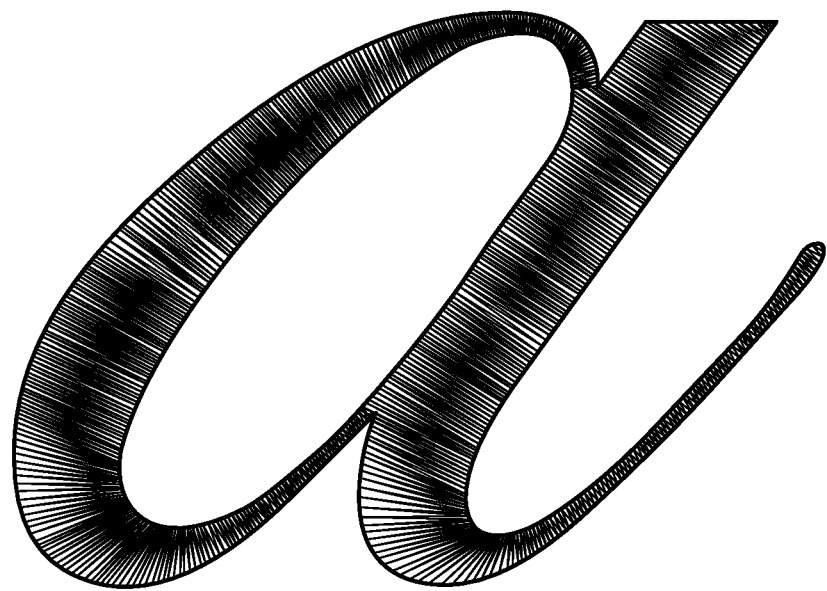
FIGS. 9A-9B illustrate an example of generating a mesh.
Figure 9B:
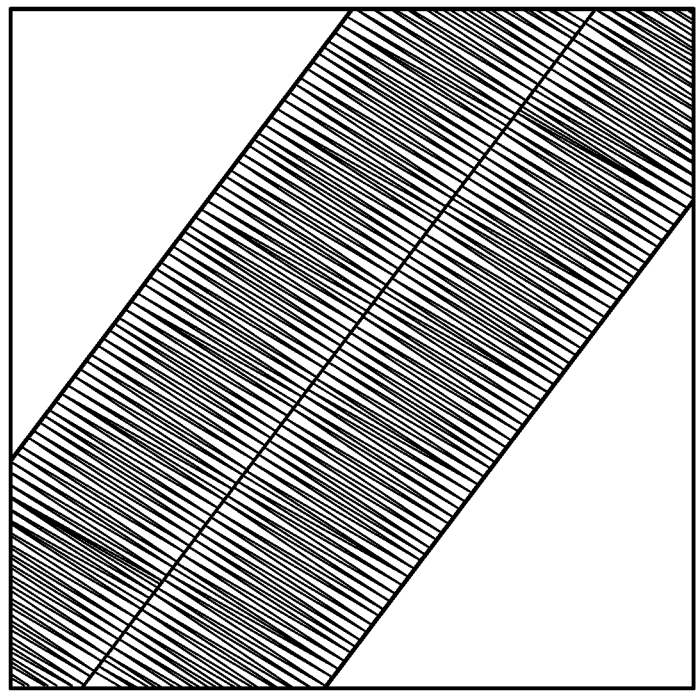

At step 208 of process 200 of FIG. 2, a mesh is generated from collision pairs determined at step 206. In some embodiments, step 208 comprises generating mesh polygons from collision pairs. That is, collision pairs are mapped into triangles, quadrilaterals, or other simple convex polygons that define a mesh and that can be rendered using a graphics language such as OpenGL. In some embodiments, the collision pairs and resulting mesh are sufficiently dense for high-definition or above quality renderings that support high degrees or levels of zoom. FIG. 9A illustrates an example of a mesh generated for the outline of FIGS. 8A-8D, and FIG. 9B illustrates a zoomed view of a portion of the generated mesh. At step 210 of process 200 of FIG. 2, the mesh generated at step 208 is optionally stored, e.g., in assets database 108 of system 100 of FIG. 1, for later rendering.

Figure 10:
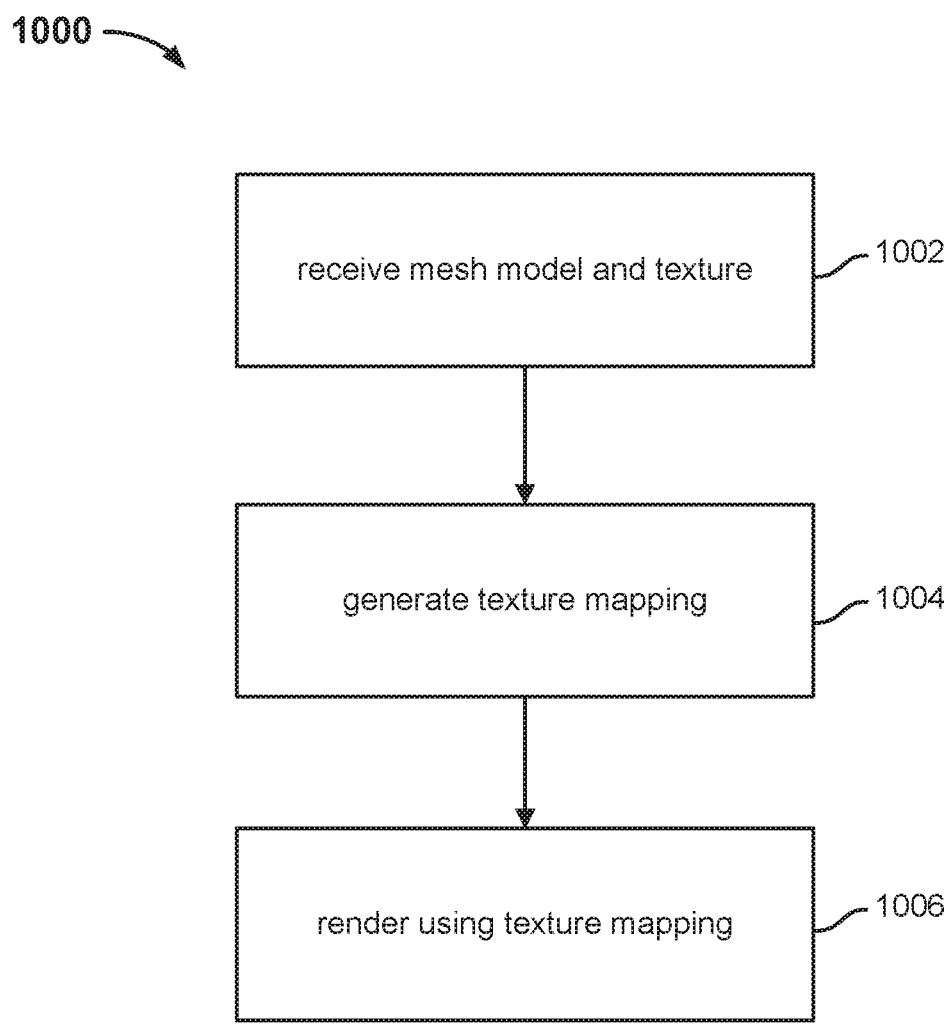
FIG. 10 is a high level flow chart illustrating an embodiment of a process for rendering an object or figure from a mesh model using a texture.

FIG. 10 is a high level flow chart illustrating an embodiment of a process for rendering an object or figure from a mesh model of the object or figure using a prescribed texture. For example, process 1000 may be employed to render a mesh stored in assets database 108 of system 100 of FIG. 1 and/or generated using process 200 of FIG. 2. In some embodiments, process 1000 may be iterated with respect to each of a plurality of meshes corresponding to two-dimensional cross-sections to generate a three-dimensional rendering. Process 1000 of FIG. 10 starts at step 1002 at which a mesh model of an object or figure is received along with a texture to be applied to the model during rendering. The mesh model may be received directly from process 200 of FIG. 2 or from a storage location at which the mesh model is stored. The texture may comprise any image. At step 1004, a texture mapping, such as a uv mapping, is generated. The texture mapping of step 1004 comprises assigning pixels in the texture image to polygons comprising the mesh model. For example, if the mesh model comprises a triangle mesh, triangle shaped portions of the texture image are mapped to triangles comprising the mesh model. At step 1006, the associated object or figure is rendered by painting or applying the texture image on the mesh model according to the texture mapping determined at step 1004.

Any appropriate technique may be employed to determine the texture mapping of step 1004 of process 1000. An example technique for computing uv coordinates for a model is next described. In this technique, the u coordinate is assigned a value of "0" for one side of an outline, a value of "1" for the opposite side of the outline, and intermediary values in between the two sides. The v coordinate is computed by determining a scale (which scales the input texture height in the output texture); determining a length of a curve; determining a number of times the input texture repeats along the curve using the formula repeat_count=round (curve length/(image height*scale)); and for each position along the curve, computing v=repeat_count*curve position/curve_length. For instance, consider a numerical example in which an input texture comprising 32×128 pixels is to be mapped to 64 pixels in the output and to a curve that is 600 pixels long. In this case, repeat_count=round(600/64)=9, and for 150 pixels from the start of the curve v=9*(150/600)=2.25.

Figure 11:
FIG. 11 illustrates an example of stitched or embroidered font letters.

As described, the disclosed techniques may be employed to automatically parse an outline of an object or figure into a mesh model, which may then be used to render the object or figure with any arbitrary texture. Some of the given examples described automatically generating mesh models for outlines comprising font letters. Such font letter meshes may be employed to generate fonts having any desired textures. For example, a stitched or embroidered font may be generated by mapping an input texture image comprising threads sewn in a line to polygons of the mesh models of the font letters using process 1000 of FIG. 10. FIG. 11 illustrates an example of embroidered font letters comprising a monogrammed word that have been automatically generated using the disclosed techniques. As depicted, the visual integrity of the stitching is preserved in the automatically generated embroidered font without requiring any manual, e.g., artist, intervention.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
a processor configured to:
  determine one or more center curves for an outline of an object or figure;
  for each of a plurality of points of each of the one or more center curves:
    cast a pair of rays from a center curve in opposite directions, wherein the rays collide with opposite sides of the outline; and
    generate a collision pair comprising a line connecting collision points of the pair of rays on opposite sides of the outline;
  select a set of collision pairs for the outline, wherein the set comprises one or more connected series of well-ordered collision pairs that exhibit monotonic behavior and wherein generated errant collision pairs are not included in the set;
  generate a mesh model of the object or figure by mapping each of the set of collision pairs to convex polygons used to define the mesh model; and
  render the object or figure with any arbitrary texture based on the generated mesh model; and
a memory coupled to the processor and configured to provide the processor with instructions.

2. The system of claim 1, wherein the outline of the object or figure comprises a two-dimensional outline.

3. The system of claim 1, wherein the rays are perpendicular to the center curve.

4. The system of claim 1, wherein the rays are not perpendicular to the center curve.

5. The system of claim 1, wherein to select the set of collision pairs comprises to interpolate to generate collision pairs to fill gaps in the selected set.

6. The system of claim 1, wherein adjacent collision pairs in a series are adjacent on opposite sides of the outline.

7. The system of claim 1, wherein adjacent collision pairs in a series have a same order on opposite sides of the outline.

8. The system of claim 1, wherein collision pairs in a series do not intersect.

9. The system of claim 1, wherein the texture comprises an image.

10. The system of claim 1, wherein the processor is further configured to generate a texture mapping for the mesh model and the texture.

11. The system of claim 10, wherein to generate the texture mapping comprises to map pixels of the texture to polygons comprising the mesh model.

12. The system of claim 10, wherein the texture mapping comprises a uv coordinates mapping.

13. The system of claim 1, wherein the outline of the object or figure comprises a closed shape or geometry.

14. The system of claim 1, wherein the outline of the object or figure comprises an outline of a font letter.

15. The system of claim 14, wherein a stitched or embroidered font letter is automatically generated using the mesh model and a texture comprising sewn threads.

16. A method, comprising:
determining one or more center curves for an outline of an object or figure;
for each of a plurality of points of each of the one or more center curves:
  casting a pair of rays from a center curve in opposite directions, wherein the rays collide with opposite sides of the outline; and
  generating a collision pair comprising a line connecting collision points of the pair of rays on opposite sides of the outline;
selecting a set of collision pairs for the outline, wherein the set comprises one or more connected series of well-ordered collision pairs that exhibit monotonic behavior and wherein generated errant collision pairs are not included in the set;
generating a mesh model of the object or figure by mapping each of the set of collision pairs to convex polygons used to define the mesh model; and rendering the object or figure with any arbitrary texture based on the generated mesh model.

17. The method of claim 16, wherein the outline of the object or figure comprises a two-dimensional outline.

18. The method of claim 16, wherein the rays are perpendicular to the center curve.

19. The method of claim 16, wherein the rays are not perpendicular to the center curve.

20. The method of claim 16, wherein selecting the set of collision pairs comprises interpolating to generate collision pairs to fill gaps in the selected set.

21. The method of claim 16, wherein adjacent collision pairs in a series are adjacent on opposite sides of the outline.

22. The method of claim 16, wherein adjacent collision pairs in a series have a same order on opposite sides of the outline.

23. The method of claim 16, wherein collision pairs in a series do not intersect.

24. The method of claim 16, wherein the texture comprises an image.

25. The method of claim 16, further comprising generating a texture mapping for the mesh model and the texture.

26. The method of claim 25, wherein generating the texture mapping comprises mapping pixels of the texture to polygons comprising the mesh model.

27. The method of claim 25, wherein the texture mapping comprises a uv coordinates mapping.

28. The method of claim 16, wherein the outline of the object or figure comprises a closed shape or geometry.

29. The method of claim 16, wherein the outline of the object or figure comprises an outline of a font letter.

30. The method of claim 29, wherein a stitched or embroidered font letter is automatically generated using the mesh model and a texture comprising sewn threads.

31. A computer program product embodied in a non-transitory computer readable storage medium and comprising computer instructions for:
  determining one or more center curves for an outline of an object or figure;
  for each of a plurality of points of each of the one or more center curves:
    casting a pair of rays from a center curve in opposite directions, wherein the rays collide with opposite sides of the outline; and
    generating a collision pair comprising a line connecting collision points of the pair of rays on opposite sides of the outline;
  selecting a set of collision pairs for the outline, wherein the set comprises one or more connected series of well-ordered collision pairs that exhibit monotonic behavior and wherein generated errant collision pairs are not included in the set;
  generating a mesh model of the object or figure by mapping each of the set of collision pairs to convex polygons used to define the mesh model; and
  rendering the object or figure with any arbitrary texture based on the generated mesh model.

32. The computer program product of claim 31, wherein the outline of the object or figure comprises a two-dimensional outline.

33. The computer program product of claim 31, wherein the rays are perpendicular to the center curve.

34. The computer program product of claim 31, wherein the rays are not perpendicular to the center curve.

35. The computer program product of claim 31, wherein selecting the set of collision pairs comprises interpolating to generate collision pairs to fill gaps in the selected set.

36. The computer program product of claim 31, wherein adjacent collision pairs in a series are adjacent on opposite sides of the outline.

37. The computer program product of claim 31, wherein adjacent collision pairs in a series have a same order on opposite sides of the outline.

38. The computer program product of claim 31, wherein collision pairs in a series do not intersect.

39. The computer program product of claim 31, wherein the texture comprises an image.

40. The computer program product of claim 31, further comprising computer instructions for generating a texture mapping for the mesh model and the texture.

41. The computer program product of claim 40, wherein generating the texture mapping comprises mapping pixels of the texture to polygons comprising the mesh model.

42. The computer program product of claim 40, wherein the texture mapping comprises a uv coordinates mapping.

43. The computer program product of claim 31, wherein the outline of the object or figure comprises a closed shape or geometry.

44. The computer program product of claim 31, wherein the outline of the object or figure comprises an outline of a font letter.

45. The computer program product of claim 44, wherein a stitched or embroidered font letter is automatically generated using the mesh model and a texture comprising sewn threads.

* * * * *